2,980,547

HIGH REFRACTIVE INDEX GLASS BEADS

Vincent L. Duval d'Adrian, Shrewsbury, Mo., assignor to Flex-O-Lite Manufacturing Corporation, St. Louis, Mo., a corporation of Missouri No Drawing. Filed May 3, 1957, Ser. No. 656,772

3 Claims. (Cl. 106—47)

This invention relates to improvements in glass beads and in particular is concerned with a glass bead of special composition and of high refractive index.

The glass beads of this invention find particular utility as reflective beads used in highway marking paints, roadside signs which are adapted to be illuminated at night and for illuminating other surfaces through reflective brilliance of a light directed upon the surface. The high refractive index glass beads also find utility in the electrical arts by virtue of their high dielectric constant and relatively low power factor and may be employed in transformers and like apparatus where such physical characteristics are in demand.

It is a particular finding of this invention that a glass bead composition resulting in a refractive index of about 1.85 to about 1.95 and above, and preferably between about 1.91 to about 1.93, have very desirable reflective brilliance properties. These beads display optimum brilliance at these refractive indices when used in highway marking paints or upon reflective signs which are adapted to be illuminated at night. The beads of this invention have a very desirable crystal clear or waterwhite characteristic which is especially advantageous. The conventional high index glass beads used in the industry today are slightly colored and therefore do not have daytime compatibility since the color of the bead undesirably changes or masks the color of the surface on which the beads are secured, thereby giving an off-color effect. As a further consequence of the glass bead composition of this invention, there has been provided a bead which is resistant to sulphur fumes and industrial gases containing sulphur such as hydrogen sulfide, sulfur dioxide and the like which are injurious to glass beads which have been previously employed in this field.

Reflective glass beads having a high degree of brilliance have been described in the Gebhard et al. Patent 2,326,634 for use upon roadside signs for night illumination and upon highway marking paints to provide a brightly illuminated surface when the headlight of an automobile shines upon it. However, contrary to the teachings in the Gebhard et al. patent and as a result of this invention, it has been found that optimum brilliance for reflective glass beads is provided at the refractive index range of about 1.91 to about 1.93. The optimum brilliance is taken in conjunction with optimum visibility to the observer whose eye is not too far removed from the axis of the directed light such as in the case for an automobile driver who views a reflective highway marking paint. These beads therefore provide a good range of reflection to the viewer.

Further the glass beads of this invention find particular utility in applications upon highway paint or outdoor signs for illumination since they withstand attack of sulfur containing fumes. Lead oxide containing beads are subject to conversion to lead sulfide and a formation of an opaque coating when contacted with such sulfur containing industrial gases which are quite often encountered in industrial regions. This undesirable attribute of the lead oxide beads has been obviated by the instant invention through the provision of a high refractive index bead which is not subject to attack by sulphur containing gases.

The basic components of the glass bead composition of this invention are barium carbonate, boric acid, titanium dioxide and barium peroxide. When these components are used, a high refractive index glass bead having good dispersion and excellent brilliance is provided. The components employed are readily available in the industry and easily produced in the usual glass making and bead producing techniques.

Accordingly, it is a primary object of this invention to provide a crystal glass bead having light reflective characteristics of optimum brilliance.

It is a further object of this invention to provide a crystal clear glass bead having a refractive index of about 1.85 to 1.95 and preferably between about 1.91 to 1.93 which provides good reflective brilliance when used on surfaces illuminated at varying angles in the dark.

Still another object of this invention is to provide a glass having a high refractive index which is not subject to coating or attack by sulfur containing gases.

Yet a further object of this invention is to provide a glass bead having a high refractive index of about 1.85 to about 1.95 having good brilliance which is resistant to coating or attack by sulfur containing gases and which may be produced from barium carbonate, barium peroxide, boric acid and titanium dioxide.

Still another object of this invention is to provide a glass composition from barium carbonate, barium peroxide, boric acid and titanium dioxide.

Further objects of this invention will appear in the detailed description which follows and will be further apparent to those skilled in the art.

In the production of the high refractive glass beads of this invention it has been an objective to use components having a high refractive index which will produce a glass bead of clear transparent characteristics. In the manufacture of such glass beads there have been used in the novel glass composition, barium carbonate, boric acid, barium peroxide and titanium dioxide, which provide the respective oxides in the final product. The barium carbonate has been employed as a high melting point flux while the boric acid is desirable as a low melting point flux. The titanium dioxide has a very high refractive index when the rutile type is employed. The rutile form of titanium dioxide has a refractive index ranging from 2.61 to 2.9 and is in the average of 2.7.

At the very beginning of the development of this invention, zircon was employed but it was found that the glass produced was a black color and would transmit only a minimum amount of light. Subsequently, it was found that barium peroxide could be employed with the deletion of zircon to produce a crystal glass. This was found to be quite advantageous since zircon, i.e., zirconium silicate, contains silica, which has a low refractive index of 1.5 and it was determined that zircon could be deleted and a clear color could be obtained.

Further, through the use of the barium in the form of barium carbonate and barium peroxide there is produced in the final glass composition a barium oxide which has a high refractive index of about 1.98. This high refractive index in one of the future components of the glass aids very substantially in producing a high refractive index glass bead. Further, the barium oxide finally produced in the glass, serves as the RO compound which is a necessary ingredient in glass compositions.

In the production of glass beads of the type sought in this invention, there are a number of critical requirements. The glass beads which are prepared in conventional fashion, as is well known in the art, must be of comparatively small particle size and must have high reflective power. This reflective power which gives a brilliant aspect to the surface illuminated in the dark must be coupled with a fair degree of visibility to an observer located slightly off the axis of the directed light as is the case for an automobile driver. Without some reflective angularity, beads which otherwise give very good reflective brilliance, are not visibly reflective when viewed slightly away from the same line as the path of directed light beam from the illuminating source to the beads. Thus, when the observer moves outside the ray of light being presented to the illuminated surface, no substantial amount of lighted surface can be seen. It has been found in this invention that glass beads prepared according to the formulation listed below, and having a refractive index in the range of about 1.85 to about 1.95, give a very high degree of brilliance coupled with good visibility under the normal conditions encountered by an automobile driver whose own headlights light up a highway marking painted strip. Glass beads of somewhat higher refractive index give a very high degree of brilliance, but relatively poor angular visibility such that they are not practicably suitable in highway marking paints or on the surfaces of road signs. In the manufacturing of these beads, it has been further found desirable to carry out the fusion process in a tank free from any deleterious contaminating material and tanks lined with platinum have been found to be suitable. The manufacture of the glass is accomplished by melting the glass charge or batch in a conventional glass furnace having a generally closed top with openings for escape of gases. The furnace is made of conventional heat resistant refractory that is iron free to prevent discoloration of the ultimate glass. In the production of the melt the heated furnace has added to it in incremental batches the composition of this invention and each batch is melted before an additional batch is employed. The temperature employed is in the range of about 2100–2300° F., which is within the range of temperatures conventionally employed in glass manufacture. After sufficient batches have been added to bring the glass melt up to a desired level, which may take a period of 12 hours, the melt is ready for use. It is to be noted that in the production of the melt the glass is quite fluid and non-viscous and as a matter of fact ripples may be seen due to normal vibration and turbulence when additional batches are added to the liquid. The additional batches float on the top of the liquid melt until they are melted. The process can be carried out in continuous fashion by dispensing the molten glass through an outlet communicating with the body of the glass melt underneath the liquid level.

After the melt has been prepared it is ready for production by conventional methods into glass beads. It is to be noted that in the production of melt no difficulty is encountered in fining since any gases liberated in the melting of the charge are very rapidly discharged. This takes place in a very short time, in the order of 5 to 10 minutes, as compared to fining time of up to 2 hours for more viscous glasses of different formulations.

After the glass melt has been prepared the manufacture can be accomplished by conventional methods such as disclosed in the Stradley Patent No. 2,790,723 and Rindone Patent No. 2,838,408. It is desirable that the molten glass be quenched rapidly because of the considerable proportion of titanium dioxide, which has a tendency to cause devitrification as disclosed in the Stradley et al. Patent No. 2,790,723. Thus, the molten glass can, according to the conventional practice as disclosed in the aforementioned patents, be poured directly into water where it is rapidly cooled to form frit or cullet. The frit is then dried and ground to the desired size. The particles can then be converted to glass beads in conventional fashion by blowing or dropping the glass particles through a high temperature flame or radiant heating zone. One such method is shown in the Charles C. Bland United States Patent No. 2,600,963, granted June 17, 1952, assigned to applicant's assignee. They may also be prepared as disclosed in Bleecker Patent No. 1,175,224 or Potters Patent No. 2,334,578. The aforementioned particles can be spherulized to glass beads in the furnace at temperatures of 1800° F. and up, which is within the range of conventional glass, softening temperatures, and which first temperature represents the softening point of the glass composition of this invention at which beads may be formed. This temperature is below the melting point of the glass and can be obtained by conventional gas burners. In the aforementioned process the glass beads are spherulized when passed through the high temperature flame by the action of the surface tension and the discharge of the beads to air provides rapid cooling when particles are removed from the high temperature region to harden the spheres without devitrification.

In the development of this invention a formulation measured in pounds was made as follows:

EXAMPLE I

62# barium carbonate
13# silica
20# titanium dioxide
21# boric acid
14# zirconium silicate This formulation produced an undesirable glass which was pale brownish and yellow and of a refractive index of about 1.83 which was unsuitable for a glass bead usage for night reflection from surfaces to be illuminated.

In the further development of this invention, a glass composition was then made according to the following formulation in which sand was deleted:

EXAMPLE II

100# barium carbonate
10# boric acid
20# titanium dioxide
20# zirconium silicate This formulation when made into glass according to standard glass making procedures of fusing the mixture at high temperatures, resulted in an undesirably discolored glass which was unsuitable. In this process a temperature of 2400° F. was required to get the zirconium silicate in solution and it was believed that this caused discoloration by conversion of the titanium dioxide to the monoxide.

In an effort to obtain a clear color and a glass bead of high refractive index, it was decided to delete both the components silica and zirconium silicate and use another component having a higher refractive index. Thus the zircon and silica were deleted and barium peroxide was employed. The barium peroxide is a good oxidizing agent and has, when converted to barium oxide, a high refractive index of 1.98 making it quite suitable for this application. The barium peroxide has been found in this invention to work very well as an oxidizing agent with the titanium dioxide to produce a crystal clear component. Zirconium silicate, commonly known as zircon, has a much lower refractive index (2.0) than titanium dioxide and was therefore deleted. In a first formulation using barium carbonate, boric acid, titanium dioxide and barium peroxide, glass beads were produced which were fairly clear but still possessed a slight tinge of yellow. These beads were found to be very directional with an adequate angular visibility and therefore unsuitable. The formulation employed was as follows:

EXAMPLE III

150# barium carbonate
45# boric acid
75# titanium dioxide
4# barium peroxide

The above formulation produced a bead having a high refractive index of about 1.93. This bead was, however, considered to be a little too directional for general application.

In an effort to obtain a white or crystal clear glass the titanium doxide was first reduced from the formulation given in Example III by the amount of 5 pounds and the barium peroxide was increased 2 pounds. This bead used the following charge:

EXAMPLE IV

150# barium carbonate
45# boric acid
70# titanium doxide
6# barium peroxide

The resulting glass composition consisted of 56.1% barium oxide, 32.2% titanium dioxide and 11.7% boric oxide, all percentages being by weight.

This glass when produced in the form of glass beads was found to give very excellent results and represents a preferred composition of this invention. Test observations in which surfaces were painted and in which glass beads were placed in standard fashion upon the top of the paint proved that very good dispersion and brilliance resulted. The directional characteristics of the beads when compared to the beads in Example III where 75 pounds of titanium dioxide were employed were improved and the critical angle was not as small. The refractive index of the glass bead made according to formulation of Example IV was in the neighborhood of 1.91 to 1.92 which was determined to be optimum under the desired conditions.

In a further effort to produce beads having good brilliance, the titanium dioxide was reduced further according to the following formulation:

EXAMPLE V

150# barium carbonate
45# boric acid
65# titanium dioxide
6# barium peroxide

This glass had a refractive index between 1.90 and 1.91 and was considered to be a suitable composition, although having slightly less clarity and reflective brilliance.

Another formulation has been employed which is similar to that of Example IV but in which the amount of boric acid is reduced. The glass beads produced were clear and stable and the refractive index was somewhat higher, in the range of about 1.94. The formulation was as follows:

EXAMPLE VI

150# barium carbonate
40# boric acid
70# titanium dioxide
6# barium peroxide

Although the refractive index was high, the angularity of reflection away from the directed light was too critical, and therefore not enough brilliance was produced at the angles through which an observer would normally look at an illuminated sign or highway paint at distances away from the source of light.

Another glass bead formulation was made similar to Example V in which, however, 5 pounds more of boric acid were employed. This formulation, as listed below in Example VII, produced a satisfactory glass bead having a refractive index of 1.85. The reflectivity however was not as high as the higher refractive index examples above.

EXAMPLE VII

150# barium carbonate
50# boric acid
65# titanium dioxide
6# barium peroxide

Such a glass bead having the lower refractive index can also be made similarly to Example V and some of the other examples by substituting a small amount of silica for some of the titanium dioxide.

From the formulations listed in Examples III through VII for glass charges providing a refractive index from about 1.85 to 1.95, it can be seen that weight of the charge components can be about 150 pounds of barium carbonate, 40 to 45 pounds of boric acid, 65 to 75 pounds of titanium dioxide, and 4 to 6 pounds of barium peroxide corresponding to about 54.4 to 55.7% barium carbonate, 14.8 to 17.0% boric acid, 24.4 to 27.8% titanium dioxide and 1.5 to 2.3% barium peroxide. The resulting oxides range from a total of 54.5% to 58.2% barium oxide, 10.3 to 12.1% boric oxide and 31.0 to 34.4% titanium dioxide.

In order to show the comparative properties of the glass beads of this invention, light reflection tests were made. In these tests painted test panels were coated with various conventional beads and the different bead formulations of this invention which have been described above. A specially rigged light source was directed upon the panels and the reflected light was picked up on the scale of a light meter at distances of 12", 24" and 48". In these tests it was found as shown below that the brilliance of the beads of this invention was unsurpassed by any of the other beads tested. As a further improved result it was noted that all of the conventional glass beads had objectionable color tinges which can be avoided by the instant invention. The objectionable color was especially evident in the high refractive index Pb—Ti beads.

In Table I below the various glass beads tested are listed in order together with their refractive indices. The reflected light has been entered for each type of glass bead tested in the column indicated "Reflected Light Brilliance" which is actually read off a scale calibrated in foot-candle subdivisions.

Table

| Bead Type | Refractive Index | Reflected Light Brilliance |
|---|---|---|
| Soda lime glass bead | 1.51 | 100 |
| U.B. Glass (Lead-bisilicate) | 1.7 | 110 |
| Mono (Lead mono-silicate) | 2.06 | 105 |
| Example III | 1.93+ | 110 |
| Example IV | 1.91–1.92 | 115 |
| Example V | 1.90–1.91 | 114 |
| Example VI | 1.94+ | 111 |

It is to be understood that some of the high refractive index glasses produced according to this invention find very good usage in fields where high refractive index glasses are required and in which the visible reflection to the viewer disposed slightly away from the directed light is not a critical feature. However, for glass bead production used on highway paints and signs, a certain amount of angularity of reflection to the viewer as above described, is desirable.

In general, it can be stated that glass beads may be made according to the formulations of this invention for paints and signs having a refractive index of about 1.85 up to about 1.95. However, the preferable range is 1.91 to about 1.92+ or 1.93 as it has been found that good dispersion and high brilliance are obtained. The size of the glass beads as is well known in the art, must be fairly small. Conventionally it has been found suitable to have sizes which pass through a 20 mesh U.S. sieve screen but are retained upon a 230 mesh screen. It has been found that high refractive index glass beads containing lead are attacked by sulfurous industrial gases. This can be avoided by the present invention through the deletion of lead oxide. Further, the viscosity in the glasses of this invention is somewhat lower than lead glasses. This is a very great advantage in making truly spherical glass beads. It is understood that truly spherical glass beads are necessary for maximum reflectivity when used in highway marking paints or on signs. More nearly perfect spheres can be obtained in the glass beads through a lower viscosity which has been found to be obtained in the instant invention. Thus in the usual glass bead manufacturing process, a considerable amount of ovate shaped beads are sometimes and quite often produced when a higher viscosity glass is employed. The deletion of such undesirable ovate beads, or tear-shaped beads having a small streaming tail at one side, is a marked advance in the art, made possible by the low viscosity formulation of this invention.

Various changes and modifications may be made in this invention as will be apparent to those skilled in the art. Such changes and modifications are within the scope and teaching of this invention as defined by the claims appended hereto.

What is claimed is:

1. A reflective substantially transparent spherical glass bead consisting essentially of about 54–58% by weight of barium oxide, about 10–12% by weight of boric oxide and about 31–34% by weight of titanium dioxide.

2. A substantially crystal clear glass prepared from a charge consisting essentially of about 54–56% by weight of barium carbonate; about 15–17% by weight of boric acid; about 24–28% by weight of titanium dioxide; and about 1.5–2.3% by weight of barium peroxide in relative proportions.

3. A reflective crystal clear glass bead prepared from a charge consisting essentially of about 55.4% by weight of barium carbonate; about 16.6% by weight of boric acid; about 25.8% by weight of titanium dioxide; and about 2.2% by weight of barium peroxide.

References Cited in the file of this patent

UNITED STATES PATENTS

| | | |
|---|---|---|
| 2,472,447 | Sun | June 7, 1949 |
| 2,702,749 | Hafner et al. | Feb. 22, 1955 |
| 2,713,286 | Taylor | July 19, 1955 |
| 2,726,161 | Beck et al. | Dec. 6, 1955 |
| 2,790,723 | Stradley et al. | Apr. 30, 1957 |
| 2,838,408 | Rindone | June 10, 1958 |